United States Patent [19]

Spitzer et al.

[11] Patent Number: 4,767,540

[45] Date of Patent: Aug. 30, 1988

[54] POLYMERS CONTAINING HYDROXAMIC ACID GROUPS FOR REDUCTION OF SUSPENDED SOLIDS IN BAYER PROCESS STREAMS

[75] Inventors: Donald P. Spitzer, Riverside; Wei S. Yen, Norwalk, both of Conn.

[73] Assignee: American Cyanamid Company, Stamford, Conn.

[21] Appl. No.: 13,491

[22] Filed: Feb. 11, 1987

[51] Int. Cl.$^4$ ............................................. B01D 21/01
[52] U.S. Cl. ..................................... 210/728; 210/731; 210/734; 210/735; 423/121; 423/122; 209/5
[58] Field of Search .................... 209/5; 210/725, 727, 210/728, 731, 732–735; 423/111, 121, 122

[56] References Cited

U.S. PATENT DOCUMENTS

| | | | |
|---|---|---|---|
| 3,390,959 | 7/1968 | Sibert | 210/734 |
| 3,681,012 | 8/1972 | Sibert | 210/731 |
| 3,755,531 | 8/1973 | Tsukawaki et al. | 423/121 |
| 3,864,323 | 2/1975 | Stoy | 210/734 |
| 3,975,496 | 8/1976 | Smalley et al. | 210/734 |
| 4,480,067 | 10/1984 | Vio et al. | 524/446 |
| 4,536,296 | 8/1985 | Vio et al. | 525/329.4 |
| 4,545,902 | 10/1985 | Connelly et al. | 210/734 |
| 4,587,306 | 5/1986 | Vio et al. | 525/329.4 |
| 4,608,237 | 8/1986 | Roe et al. | 423/121 |
| 4,717,550 | 1/1988 | Spitzer et al. | 423/121 |

OTHER PUBLICATIONS

Appleton et al., "Selective Flocculation of Cassiterite," *J. S. African Inst. of Mining and Metallurgy*, vol. 76, pp. 117–119, Oct. 1975.

*Primary Examiner*—Peter Hruskoci
*Attorney, Agent, or Firm*—Frank M. Van Riet

[57] ABSTRACT

The suspended solids content of Bayer process streams is reduced by contacting said stream with a polymer which contains hydroxamic acid groups.

18 Claims, No Drawings

POLYMERS CONTAINING HYDROXAMIC ACID GROUPS FOR REDUCTION OF SUSPENDED SOLIDS IN BAYER PROCESS STREAMS

The present invention is directed to a process of alumina manufacture via the Bayer process. More particularly, it is concerned with improvements in the Bayer alumina process by the removal of suspended solids therefrom by contacting process streams with a polymer which contains hydroxamic acid groups or salts thereof.

BACKGROUND OF THE INVENTION

The almost universally used process for the manufacture of alumina is the Bayer process. In a typical commercial Bayer process, raw bauxite is pulverized to a finely divided state. The pulverized ore is then fed to a slurry mixer where a 50% solids slurry is prepared using spent liquor and added caustic. This bauxite slurry is then diluted and sent through a series of digesters where, at about 300°–800° F. and 100–2000 p.s.i., 98% of the total available alumina is extracted from ore which may contain both trihydrate and monohydrate forms of alumina. The effluent from the digesters passes through a series of flash tanks wherein heat and condensate are recovered as the digested slurry is cooled to about 230° F. and brought to atmospheric pressure. The aluminate liquor leaving the flashing operation contains about 1–20% solids, which consist of the insoluble residues that remain after reaction between the bauxite ore and basic material used to digest the ore and the insoluble products which precipitate during digestion. The coarser solid particles are generally removed with a "sand trap" cyclone. To separate the finer solid particles from the liquor, the slurry is normally fed to the center well of a mud settler where it is treated with a flocculant such as a polyacrylate polymer, flour and/or starch. As the mud settles, clarified sodium aluminate solution, referred to as "green" or "pregnant" liquor, overflows a weir at the top of the mud settling tank and is passed to the subsequent process steps. The settled solids ("red mud") are withdrawn from the bottom of the mud settler and passed through a countercurrent washing circuit for recovery of sodium aluminate and soda. Aluminate liquor overflowing the settler still contains typically 50 to 200 mg of suspended solids per liter. This liquor is then generally further clarified by filtration to give a filtrate with 10 mg. suspended solids per liter of liquor.

Alumina, in relatively pure form, is then precipitated from the filtrate as alumina trihydrate crystals. The remaining liquid phase or spent liquor is returned to the initial digestion step and employed as a digestant of additional ore after being reconstituted with additional caustic.

The aforementioned insoluble components should be separated at a relatively fast rate to make the overall Bayer process efficient. This is generally accomplished in large settlers or decanters. The separation itself should be clean and complete with but minimal amounts of residue remaining as a dispersed phase in the solubilized alumina liquor. After passage through the filtration step, the level of suspended solids should be sufficiently low to provided an alumina product from the precipitation step which meets all of the industry standards.

The efficient removal of suspended solids from Bayer process streams has been a major problem for many years.

Among the methods of overcoming the above problems and materially speeding up separation of suspended solids from process streams as well as effecting a cleaner separation of the constituents are those disclosed in U.S. Pat. No. 3,390,959 which employs polyacrylates as anionic flocculants and U.S. Pat. No. 3,681,012, which uses combinations of polyacrylates and starch in Bayer alumina recovery circuits. Also of interest in this connection are U.S. Pat. No. 3,975,496 which uses a copolymer of acrylic acid and methylolated acrylamide for the same purpose, and U.K. Patent Specification Nos. 2080272 and 2112366, which use, sequentially, combinations of polyacrylic acid and acrylate-acrylamide copolymers. Other approaches have been proposed: in Japanese Patent Publication No. 56092116 (7/25/81) is disclosed starch cationized with a quaternary ammonium salt for use as a coagulant; U.S. Pat. No. 4,083,925 promotes separation from alkali metal aluminate liquor by contacting it with anionic polyacrylamide under special conditions within the mud settler; East German (DE) Pat. No. 2552804 (8/11/77) subjects starch to treatment with sodium tetraborate and a magnesium salt to provide improved flocculating properties with lower levels of starch; Russian Pat. No. 507526 (4/06/76) reports that cationic flocculants of the formula (R—AR—CH$_2$—N—Ph)$^+$Cl$^-$ are better for solids flocculation than other known flocculants; Japanese Pat. No. J74018558 (10/05/74) discloses using an inorganic calcium compound and sodium polyacrylate for sedimentation and filtration. The use of hydroxamated polymers as flocculants for cassiterite is disclosed in Jour. So. African Inst. of Mining and Metallurgy; Vol. 76; pgs. 117–119 (1975) by Appleton et al.

The process of the present invention is designed to more effectively remove suspended solids from Bayer process streams. The improvement forming the basis of the present invention lies in adding and efficiently mixing a polymer containing hydroxamic acid groups into the Bayer process caustic aluminate process stream alone or subsequent to, followed by or in association with a conventional starch, flour and/or a polyacrylate polymer flocculant (e.g., in a primary settler). This treatment leads to reduced levels of suspended solids in the process streams when compared with state-of-the-art processes, as exemplified by the patents mentioned above. Such reductions in suspended solids can significantly reduce the need for filtration. Since the suspended solids may contain undesirable impurities such as iron or titanium, the reductions in suspended solids achieved by practice of the present invention may also result in improved purity of the resultant alumina product.

DETAILED DESCRIPTION OF THE INVENTION

According to the present invention, there is provided a process for the reduction of the suspended solids level in aluminate liquors of the Bayer alumina circuit whereby a polymer containing hydroxamic acid groups or salts thereof is added to the aluminate process stream in order to effectively remove suspended solids therefrom.

The amount of reduction in suspended solids content is measured and compared with controls, which generally comprise state-of-the-art aluminate process samples.

The anionic flocculant generally used in the Bayer process is selected from starch, flour, homopolymers of acrylic acid or acrylates, copolymers of acrylic acid or acrylates containing at least 80 molar percent acrylic acid or acrylate monomers, alkali metal, alkaline earth metal or ammonium salts of said acids, or a combination of any of the foregoing. The amount of anionic flocculant normally added ranges from 0.01 to 40 lbs. of flocculant per ton of dry mud residue.

In the context of commercial plant operation, addition of the polymers of the present invention is preferably to the settler feed as is practiced with the anionic flocculants above. Alternatively, however, polymers of the present invention may be added to the overflow from a primary settler or to the blow-off from the digesters. Said polymers may also be used in the settling of muds in the mud washing circuit.

The polymer to be employed in the present invention can vary rather broadly in type. It should be sufficiently stable to be effective under the process conditions used, e.g., high temperatures and strong caustic conditions, typically, 185°–225° F., and 80–400 g./l. total alkali content (expressed as sodium carbonate equivalent).

Thus, for example, any water soluble hydroxamic acid or salt group-containing polymer may be used in the process of the present invention. The useful polymers can best be exemplified by those containing pendant groups of the Formula (I):

wherein R is hydrogen or an cation. These polymers are well known in the art and can be derived from polymers containing pendant ester, amide, anhydride, nitrile, etc., groups by the reaction thereof with hydroxylamine or its salt.

Exemplary of the polymers which may be hydroxamated for use in the process of the present invention are acrylic, methacrylic, crotonic etc., acid ester polymers such as polymers produced from the polymerization of methyl acrylate, ethyl acrylate, t-butyl acrylate, methyl methacrylate, ethyl methacrylate, cyclohexyl methacrylate, dimethyl aminoethyl methacrylate, dimethyl aminoethyl acrylate, methyl crotonate, etc., polymers of maleic anhydride and esters thereof, and the like; nitrile polymers such as those produced from acrylonitrile etc; amide polymers such as those produced from acrylamide, methacrylamide and the like.

Hydroxamated polymers are well known to those skilled in the art and are specifically disclosed, as are methods for their production, in U.K. Patent Application 2171127 and U.S. Pat. Nos. 3,345,344; 4,480,067; 4,532,046; 4,536,296 and 4,587,306, hereby incorporated herein by reference. Generally, these hydroxamated polymers may be produced by reacting the containing the pendant reactive group, in solution, with a hydroxylamine or its salt at a temperature ranging from about 50° C. to 100° C. for several hours. From about 1–90% of the available pendant reactive groups of the polymer may be replaced by hydroxamic groups in accordance with said procedures.

In addition to reaction of hydroxylamine or its salt with a polymer solution, it has been found that a polymer latex may be reacted directly with hydroxylamine or its salt. The latex may be, e.g., a copolymer of acrylamide and methyl acrylate or a copolymer of acrylic acid and methyl acrylate. In these cases, the hydroxylamine or its salt reacts primarily with the ester groups to form hydroxamic acid groups.

Also, it has been found that inverse emulsions made of, for example, aqueous polyacrylamide or acrylamide/acrylic acid copolymers dispersed in oil can be reacted directly with hydroxylamine or its salt to give very high molecular weight polymers containing hydroxamic acid groups, all of which function efficiently in the process of the present invention.

The degree of hydroxamation, i.e., the concentration of Formula I units in the polymers useful herein, may range from about 1 to about 90 mole percent, preferably from about 5 to about 75 mole percent and, most preferably, from about 10 to about 50 mole percent.

Suitable hydroxylamine salts include the sulfates, sulfites, phosphates, perchlorates, hydrochlorides, acetates propionates and the like. The pH of the solution is adjusted to about 3–9, preferably over about 6.0, by means of acid or base addition to the solution.

Any water-soluble polymer may be used in the present process which, after hydroxamation, performs to settle suspended solids. Thus, homopolymers, copolymers, terpolymers, etc. of the above exemplified monomers may be used. Suitable comonomers which, by copolymerization, may form for, example, up to about 95 mole percent of the polymers useful herein can include acrylic acid, sodium acrylate, methacrylic acid, maleic anhydride, vinyl acetate, vinyl pyrrolidone, butadiene, styrene as well as others of the above enumerated esters, amides and/or nitriles and the like as is known in the art and is set forth in the above-incorporated patents as long as such copolymers, terpolymers etc., are water-soluble after hydroxamation. The molecular weight of the polymers useful in the process of the present invention range from about $1 \times 10^4$ to about $3 \times 10^7$.

The polymers used in the present invention are employed by adding them, usually in the form of a dilute aqueous solution, to the digested bauxite ore process stream containing solubilized alumina and suspended solids dispersed throughout, in an amount at least sufficient to settle said suspended solids. Generally, for best results, at least about 0.1 mg, of the hydroxamated polymer, per liter of the process stream should be employed. More preferably, at least 1.0 mg of the hydroxamated polymer is added.

It is understood, that higher amounts than those just stated may be employed without departing from the scope of the invention, although generally a point is reached in which additional amounts of hydroxamated polymer do not improve the separation rate over already achieved maximum rates. Thus, it is uneconomical to use excessive amounts when this point is reached.

EXAMPLE A

Three hundred parts of a 20 weight percent aqueous solution of copolymer of acrylamide and acrylic acid (92/8) having a molecular weight of 200,000 are mixed with 65.3 parts of hydroxylamine hydrochloride (a 65% excess based on copolymer amide groups), an equimolar amount, 77.1 parts, of sodium acetate and water to make a total of 600 parts. The resultant solution is heated with stirring to 70°–75° C. for 5 hours. The infrared spectrum indicates conversion of 40% of the amide groups to hydroxamate groups. This polymer is designated as Polymer A.

EXAMPLE B

100 Parts of a 25% solution of homopolymeric acrylamide having a molecular weight of 100,000 are mixed with 7.34 parts of hydroxylamine hydrochloride (0.3 mole per mole of amide) diluted to 80 parts and 8.66 parts of sodium acetate diluted to 70 parts. The pH is adjusted to and maintained at 6.5. The resultant solution is heated to 70°-75° C. for 4 hours. The hydroxamated polyacrylamide which results is designated as Polymer B.

EXAMPLE 1

To settler overflow liquor from a Bayer alumina plant is added Polymer B and mixed by stirring over a period of 60 seconds. The solids are then allowed to settle for 60 mins., while the sample is maintained at 95° C.±5° C. A sample is then withdrawn from the top and tested for turbidity, by measurement of absorption at 900 nm, and a second sample is used to measure the time to filter 100 ml through #54 Whatman filter paper. The results are set forth in Table I, below:

TABLE I

| Test No. | Dosage | Turbidity (abs @ 900 nm) | Filtration Time for 100 mls (sec) |
| --- | --- | --- | --- |
| Control | — | 0.070 | 118 |
| Control | — | 0.088 | 112 |
| Control | — | 0.076 | 108 |
| 1 | 0.01 g/l | 0.035 | 80 |
| 2 | 0.05 g/l | 0.045 | 91 |

Significant reduction in suspended solids results from the use of Polymer B, as indicated by the decreased turbidities and increased filtration rates.

EXAMPLE 2

Polymer B is added to samples of Bayer settler feed at 100° C. at a dosage of 0.020 g/l with and without subsequent addition of a commercially available polyacrylate red mud flocculant. In both cases, rapid flocculation and settling of suspended solids is observed. Measurements of suspended solids in the supernatant show both samples to contain about 5-10 ppm of suspended solids vs about 80-200 ppm for the control using said polyacrylate flocculant alone.

EXAMPLES 3-7

To various one-liter digester blow-off stream samples from a commercial Bayer process alumina plant are added varying dosages of Polymer A. Subsequently, 3 ml of 0.1% solution of a commercial sodium polyacrylate are added, the mixture is allowed to settle for 15 minutes, a portion of the supernatant liquid is filtered through a 0.45 micron millipore filter and the filtrate is analyzed for iron by atomic absorption spectroscopy. The results are set forth in Table II, below.

TABLE II

| Example | Dosage, g/l | $Fe_2O_3$, mg/l |
| --- | --- | --- |
| Control | — | 12.6 |
| 3 | 0.50 | 7.6 |
| 4 | 0.05 | 6.9 |
| 5 | 0.01 | 6.4 |
| Control | — | 9.3 |
| 6 | 0.05 | 8.4 |

TABLE II-continued

| Example | Dosage, g/l | $Fe_2O_3$, mg/l |
| --- | --- | --- |
| 7 | 0.01 | 8.6 |

As can be seen, use of polymer A results in significantly reduced iron levels in the filtered supernatant.

EXAMPLE 8

Settler feed from a commercial Bayer process plant is treated with plant polyacrylate flocculant at a dosage equivalent to standard plant practice (control) or with Polymer A and allowed to settle in a 100° C. oven for 1, 2 and 4 hours. After settling, 150 ml of the supernatant are carefully withdrawn and mixed with 30 ml of caustic solution, brought to a boil, cooled and measured for turbidity in a flow through cell. Conversion of the turbidty readings to solids concentration is made in accordance with a plant calibration. The results are set forth in Table III, below.

TABLE III

| | Settling Time | | |
| --- | --- | --- | --- |
| | 1 hour | 2 hours | 4 hours |
| Reagent | suspended solids (mg/l) | | |
| Plant flocculant | 200 | 128 | 79 |
| Product A at 10 mg/l | 78 | 56 | 40 |
| Product A at 40 mg/l | 19 | 17 | 10 |

At all times, Product A leads to major improvements in the level of suspended solids, compared to the standard flocculant.

EXAMPLE 9-15

To settler feed from a commercial Bayer process alumina plant is added Polymer A or B in accordance with the present invention. In some cases, this addition is followed by mixing in a commercial plant flocculant according to accepted procedure. The treated liquor is allowed to settle at 100° C. for times up to 3.5 hours. A portion of the resultant supernatant liquor is then withdrawn and the turbidity thereof measured. The results are set forth in Table IV, below.

TABLE IV

| Example | Dosage | Turbidity (N.T.U.) | | | | |
| --- | --- | --- | --- | --- | --- | --- |
| | settling time | 15 min | 1 hr. | 1 hr. | 3.5 hr | 3.5 hr. |
| — | plant floc | 229.0 | 219.0 | 230.0 | 94.0 | — |
| 9 | 10 ppm Polymer A | 118.0* | 38.0 | — | 16.3* | 9.1 |
| 10 | 20 ppm Polymer A | 63.0* | 20.0 | — | 15.1* | 10.0 |
| 11 | 40 ppm Polymer A | 36.0* | 9.0 | 18.5* | 4.2* | 6.0 |
| 13 | 40 ppm Polymer B | — | 108.0 | 158.0* | 79.0* | — |

*plant floc. also added 2 minutes after Polymer A or B

A gravimetric measurement of suspended solids is made in accordance with plant procedure on some of those samples with very low turbidity readings by adding to 100 ml of liquid, 50 ml of caustic solution, heating the resultant solution to boiling, filtering through a 0.5μ filter, drying the resultant filter paper and residue, igniting the dried material and weighing. The results are set forth in Table V, below.

TABLE V

| | | Turbidity | Solids (mg/l) |
| --- | --- | --- | --- |
| 11A | 20 ppm | 15.1 | 16.0 |
| 11B | 20 ppm | 10.0 | ≈0.0 |

TABLE V-continued

|  |  | Turbidity | Solids (mg/l) |
|---|---|---|---|
| 12A | 40 ppm | 6.0 | 16.0 |

The examples give consistently lower turbidities (low suspended solids) than the plant flocculant after an hour or more of settling.

EXAMPLES 13-18

Settler feed from another commercial Bayer process plant is treated with Polymer A and compared to the results achieved with a standard dosage of the usual plant sodium polyacrylate flocculant. The reagents are mixed into 500 ml aliquots of the settler feed liquor and the resultant solutions are settled at 100° C. for 4 hours. 100 Ml aliquots of the supernatant are then removed, filtered and washed through pre-weighed glass fiber paper which is then dried and weighed to measure suspended solids directly. The results are set forth in Table VI, below.

TABLE VI

| Example | Reagent | Dosage | Suspended Solids (mg/l) |
|---|---|---|---|
| — | Plant floc. |  | 79 |
| 13 | Polymer A | 1 ppm | 55 |
| 14 | " | 2 ppm | 21 |
| 15 | " | 4 ppm | 21 |
| 16 | " | 10 ppm | 67 |
| 17 | " | 20 ppm | 75 |
| 18 | " | 40 ppm | 89 |

It is noted that low amounts of Polymer A are 4 times more effective than the normally used plant flocculant.

EXAMPLES 19-45

A series of hydroxamated acrylamide polymers is prepared by adding hydroxylamine sulfate to the polymer solution with as little added water as possible. The pH is adjusted to 6.0 with 50% sodium hydroxide. Heating is conducted at 70°-75° C. for 4-6 hours with the addition of 50% sulfuric acid as needed to maintain pH at 6.5±0.5 until reaction is complete. Dilute (0.1% or 1.0%) aqueous solutions of the resultant hydroxamated polymers are then used to treat one liter aliquots of settler feed from a commercial Bayer process plant. Initial settling rates are measured after which the samples are maintained at 80° C. to complete the 60 minute settling time. The final volume of solids and the turbidity and suspended solids of the resultant supernatant are then measured, the suspended solids being determined by filtering the top 250 ml through preweighed paper, followed by washing, drying and reweighing. The results are set forth in Table VII, below.

Exceptionally low suspended solids levels are achieved, including several results with less than 10 mg/l suspended solids.

TABLE VII

| Example | Reagent M.W. | NH$_2$OH—AMD mole ratio | CONHOH* | Dosage (ppm) | Settling Rate (ft/hr.) | Compaction Volume (ml) | Turbidity (N.T.U.) | Suspended Solids (mg/l) |
|---|---|---|---|---|---|---|---|---|
| — |  | Plant Flocculant |  | 1$^a$ | 5.3 | 218 | 88 | 78 |
| — |  | " |  | 2 | 38.7 | 153 | 139 | 114 |
| 19 | 10K | 0.3 | (13) | 4 | 3.9$^b$ | 305 | 82 | 88 |
| 20 | 10K | 0.3 | (13) | 10 | 3.9$^b$ | 295 | 81 | 92 |
| 21 | 10K | 0.3 | (13) | 40 | 3.3$^b$ | 330 | 161 | 180 |
| 22 | 10K | 0.5 | 33 | 4 | 4.5$^b$ | 250 | 63 | 31 |
| 23 | 10K | 0.5 | 33 | 10 | 4.6$^b$ | 235 | 56 | 22 |
| 24 | 10K | 0.5 | 33 | 40 | 4.6 | 245 | 80 | 28 |
| 25 | 10K | 1.0 | 59 | 4 | 4.4 | 248 | 45 | 39 |
| 26 | 10K | 1.0 | 59 | 10 | 4.1 | 242 | 37 | 34 |
| 27 | 10K | 1.0 | 59 | 40 | 3.9 | 245 | 23 | 15 |
| 28 | 10K | 1.5 | 70 | 4 | 5.0 | 250 | 53 | 43 |
| 29 | 10K | 1.5 | 70 | 10 | 4.3 | 243 | 45 | 55 |
| 30 | 10K | 1.5 | 70 | 40 | 3.8 | 260 | 53 | 42 |
| 31 | 100K | 0.5 | (24) | 4 | 5.0 | 252 | 61 | 43 |
| 32 | 100K | 0.5 | (24) | 10 | 4.2 | 247 | 56 | 60 |
| 33 | 100K | 0.5 | (24) | 40 | 4.3 | 220 | 22 | 34 |
| 34 | 100K | 1.0 | 22(35) | 4 | 4.8 | 233 | 49 | 2.4 |
| 35 | 100K | 1.0 | 22 | 10 | 4.3 | 232 | 47 | 5.2 |
| 36 | 100K | 1.0 | 22 | 40 | 4.8 | 216 | 27 | 6.4 |
| 37 | 100K | 1.5 | (44) | 4 | 3.4 | 297 | 78 | 78 |
| 38 | 100K | 1.5 | (44) | 10 | 2.4 | 305 | 74 | 68 |
| 39 | 100K | 1.5 | (44) | 40 | 3.0 | 295 | 34 | 29 |
| 40 | 420K | 2.0 | (40) | 4 | 5.1 | 212 | 2.0 | 5.6 |
| 41 | 420K | 2.0 | (40) | 10 | 4.7 | 210 | 8.9 | 6.4 |
| 42 | 420K | 2.0 | (40) | 40 | 7.0 | 200 | 10.2 | 6.0 |
| 43 | 200K | 1.2 | 43 | 4 | 3.9 | 223 | 40.4 | 21.2 |
| 44 | 200K | 1.2 | 43 | 10 | 5.1 | 220 | 24.5 | 20.4 |
| 45 | 200K | 1.2 | 43 | 40 | 6.7 | 175 | 14.0 | 8.0 |

*Mole percent hydroxamic acid groups. Numbers in parentheses are estimates from acid usage. Others from nuclear magnetic resonance spectroscopy.
$^a$1 ppm ≈ 40 g/ton mud solids.
$^b$fuzzy interface at early stages of settling.

EXAMPLES 46-59

Following the procedures of Examples 19-45, additional settling tests are conducted on another settler feed (containing 10.5 to 23.9 g/l suspended solids) from a Bayer process plant, utilizing varying molecular weight hydroxamated acrylamide polymer except that the settling time is limited to 30 minutes. Measurements of suspended solids are based on a correlation of % transmission at 910 nm vs mg/l suspended solids that has already been established at this plant. The correlation is calibrated to only 94 mg/l (27% transmission)

and higher turbidities are estimated by extrapolation. The results are set forth in Table VIII, below.

Suspended solids levels achieved are as low as 5-10 mg/l and settling rates are as high as 11.3 meters/hour.

TABLE VIII

| | | Reagent | | 1 PPM | | 2 PPM | | 4 PPM | | 8 PPM | |
|---|---|---|---|---|---|---|---|---|---|---|---|
| Example | M.W. | NH$_2$OH—AMD mole ratio | CONHOH mole % | Solids (mg/l) | SR (m/hr) | Solids (mg/l) | SR (m/hr) | Solids (mg/l) | SR (m/hr) | Solids (mg/l) | SR (m/hr) |
| 46 | 100K | 1.0 | 22 | 150 | — | — | — | 200 | — | — | — |
| 47 | 200K | 1.2$^a$ | 43 | 58 | — | — | — | 71 | — | — | — |
| 48 | 200K | 1.0 | — | 73 | — | — | — | 48 | — | — | — |
| 49 | 200K | 1.5 | — | 89,100 | 3.6 | 60 | 4.3 | 26,22 | 3.8 | 7 | 6.7 |
| 50 | 200K | 2.0 | — | 66 | — | 35 | 8.0 | 27,11 | 4.3 | 5 | 5.9 |
| 51 | 420K | 1.0 | 23 | 73 | — | — | — | 100 | — | — | — |
| 52 | 420K | 1.5 | 40 | 88 | — | — | — | 63 | — | — | — |
| 53 | 420K | 2.0 | 45 | 43,68 | 3.7 | 44 | 4.3 | 29,33 | 4.5 | 9 | 9.7 |
| 54 | 600K | 1.0 | — | 62,76 | 6.4 | 48 | 7.6 | 14,15 | 9.5 | 10 | 11.3 |
| 55 | 600K | 1.5 | — | 94 | — | — | — | 92 | — | — | — |
| 56 | 600K | 2.0 | — | 100 | — | — | — | 200 | — | — | — |
| 57 | 800K | 1.0 | — | 150 | — | — | — | 100 | — | — | — |
| 58 | 800K | 1.5 | — | 76 | — | — | — | 71 | — | — | — |
| 59 | 800K | 2.0 | — | 81 | — | — | — | 54 | — | — | — |

SR = Settling Rate
$^a$plus equivalent sodium acetate

EXAMPLES 60-112

Using various polymers as set forth in the previous examples, settling tests are done on a settler feed liquor (30-40 gm suspended solids per liter) from a Bayer alumina plant using a bauxite ore that is known to give high surface area red muds that are difficult to settle. The polymers of the present invention are added to the settler feed liquor in one liter cylinders and the treated liquors are allowed to settle for 30 minutes at 90° C. The cylinders are fitted with slowly rotating (approx. 2 rpm) rakes to aid compaction. Samples of the settled liquors are withdrawn from the top and turbidity is measured by the absorbance at 910 nm, which is converted to mg/l of suspended solids, using an established plant correlation (Table IX).

Runs are also conducted where the polymer of the present invention is first mixed into the settler feed liquor, followed by addition of a commercially available, high molecular weight polyacrylate (Table X).

TABLE IX

SETTLING AGENTS ALONE
REAGENT ADDED

| Ex | Polymer of Previous Ex. Number | ppm | Compacted Vol. (ml) | Settling rate (ft./hr) | Suspended solids (mg/l) |
|---|---|---|---|---|---|
| 60 | (a) | 10 | 460 | 1.6 | 50. |
| 61 | " | 20 | 440 | 1.8 | 10 |
| 62 | " | 40 | 250 | 2.9 | 1 |
| 63 | " | 60 | — | 3.6 | 1 |
| 64 | 57 | 20 | 440 | 2.0 | 6 |
| 65 | 57 | 40 | 230 | 4.7 | 2 |
| 66 | 57 | 60 | 230 | 5.2 | 2 |
| 67 | 58 | 20 | 400 | 1.9 | 8 |
| 68 | 58 | 40 | 230 | 4.9 | 5 |
| 69 | 58 | 60 | 225 | 8.2 | 8 |
| 70 | 59 | 20 | 510 | 1.3 | 20 |
| 71 | 59 | 40 | 285 | 4.4 | 5 |
| 72 | 59 | 60 | 250 | 5.4 | 8 |
| 73 | 56 | 20 | 465 | 1.6 | 40 |
| 74 | 56 | 40 | 415 | 3.1 | 5 |
| 75 | 55 | 20 | 330 | 3.1 | 6 |
| 76 | 55 | 40 | 230 | 3.8 | 4 |
| 77 | 54 | 20 | 325 | 1.8 | 6 |
| 78 | 54 | 40 | 200 | 7.3 | 4 |
| 79 | 53 | 20 | 480 | 1.3 | 13 |
| 80 | 53 | 40 | 295 | 3.4 | 3 |
| 81 | (b) | 20 | 490 | 1.3 | 18 |
| 82 | " | 40 | 265 | 1.7 | 6 |
| 83 | 51 | 20 | 455 | 1.5 | 9 |
| 84 | 51 | 40 | 320 | 2.7 | 1 |
| 85 | 52 | 20 | 460 | 1.4 | 15 |
| 86 | 52 | 40 | 360 | 2.2 | 2 |
| 87 | 47 | 20 | 400 | 1.4 | 15 |
| 88 | 47 | 40 | 360 | 3.7 | 3 |
| 89 | 50 | 20 | 570 | 1.1 | 28 |
| 90 | 50 | 40 | 330 | 3.4 | 4 |
| Commercial High MW Sodium polyacrylate | | 3.2 | 230 | 10.3 | 57 |
| Plant Overflow Liquor | | | | | 78 |

(a) Preparation as for polymer of Ex. 54, except reaction is conducted entirely at pH 3-4.
(b) Preparation as for polymer of Ex. 53, except reaction is conducted entirely at pH 3-4.

TABLE X

SETTLING AGENTS PLUS CONVENTIONAL RED MUD FLOCCULANT
REAGENTS ADDED

| Ex. | 10 ppm of Polymer of Ex. No. | Commercial High Molecular Weight Polyacrylate | Settling Rate (ft. hr.) | Suspended Solids (mg/l) |
|---|---|---|---|---|
| 91 | — | 0.75 PPM | 6.9 | 67. |
| 92 | — | 1.0 PPM | 13.0 | 124. |
| 93 | — | 1.5 PPM | 35. | 148. |
| 94 | 47 | 1.0 PPM | 13.5 | 85 |
| 95 | 54 | 1.0 PPM | 33.2 | 95 |
| 96 | 60 | 1.0 PPM | 30.8 | 64 |
| 97 | 51 | 1.0 PPM | 22.1 | 70 |
| 98 | 53 | 1.0 PPM | 34.5 | 109 |
| 99 | 81 | 1.0 PPM | 22.7 | 75 |
| 100 | 52 | 1.0 PPM | 19.7 | 79 |
| 101 | 57 | 1.0 PPM | 32.0 | 65 |
| 102 | 58 | 1.0 PPM | 45.4 | 75 |
| 103 | 59 | 1.0 PPM | 28.8 | 55 |
| 104 | 56 | 1.0 PPM | 27.8 | 90 |
| 105 | 55 | 1.0 PPM | 34.5 | 84 |
| 106 | 50 | 1.0 PPM | 14.6 | 89 |
| 107 | 54 | 0.25 PPM | 2.7 | 24 |
| 108 | 60 | 0.25 PPM | 4.0 | 31 |
| 109 | 53 | 0.25 PPM | 2.5 | 25 |
| 110 | 57 | 0.25 PPM | 4.4 | 35 |
| 111 | 58 | 0.25 PPM | 5.0 | 44 |
| 112 | 59 | 0.25 PPM | 3.6 | 35 |

Although relatively high polymer dosages are required, extremely good clarities are consistently obtained, frequently only 1-2 mg suspended solid per liter (Table IX).

In Table X, note that several combinations give very high settling rates and significantly better clarity than obtained with the commercial flocculant alone (compare, e.g., Ex. 92 and 93 with Ex. 96, 101, 102, or 103).

EXAMPLES 113-131

Additional polymers are prepared from aqueous polyacrylamide solutions, with the ratio of $NH_2OH$ (from hydroxylamine sulfate) to acrylamide indicated in Table XI. Enough NaOH is added to bring the initial pH to 6.0, and final pH varies from 7.5 to 9.2. These polymers and various polymers of previous examples are tested on settler feed liquor in a Bayer plant where the plant settler overflow liquor has a typical turbidity greater than 200 N.T.U. Laboratory settling tests with a commercial high molecular weight polyacrylate also give high turbidities (217-232 N.T.U.). Settling tests are conducted, in one liter cylinders, with measurement of the initial settling rate, than after 30 minutes at 80° C., a portion of liquor is withdrawn from the top and turbidity is measured the results are set forth in Table XI.

EXAMPLES 135-136

A commercial polyacrylamide emulsion (molecular weight 15 million) is reacted with equimolar equivalents of hydroxylamine (as hydroxylamine sulfate) and sodium hydroxide at 90° C. for 20 hours. At the end of the reaction the product remains a stable emulsion.

A portion of the above product is diluted to 0.1% (real polymer) in water.

Settler feed is collected from a Bayer alumina plant; this liquor contains 40±4 gm of suspended solids per liter. To one liter portions of this liquor (at 80±5° C.) various dosages of the above 0.1% solution are added. Initial settling rate is measured, then after 30 minutes settling in an 80° C. oven, a sample is withdrawn from the top and turbidity is measured. The results are set forth immediately below:

| Example | mg Polymer Per Liter Liquor | Settling Rate ft/hr. | Turbidity After 30 min. N.T.U. |
|---|---|---|---|
| [plant settler performance | | 5.0* | 230.] |
| 135 | 2 | 6.5 | 107 |
| 136 | 4 | 7.0 | 92 |

*minimum requirement

TABLE XI

| | REAGENT | | | DOSAGE | | | |
|---|---|---|---|---|---|---|---|
| | | | | 2 PPM | | 4 PPM | |
| Ex. No. | Polymer of Ex. No. | Mol. wt. of Acrylamide | $NH_2OH$—AMD mole ratio | Settling Rate (ft/hr) | Turbidity N.T.U. | Settling Rate (ft/hr) | Turbidity N.T.U. |
| 113 | 50 | — | — | 15.1 | 38 | 21.0 | 30 |
| 114 | — | 310K | 0.25 | 7.7 | 35 | 8.1 | 32 |
| 115 | — | " | 0.50 | 7.7 | 73 | 8.9 | 61 |
| 116 | — | " | 0.70 | 8.5 | 37 | 9.0 | 24 |
| 117 | — | " | 1.00 | 9.0 | 60 | 9.6 | 40 |
| 118 | 51 | — | — | 10.0 | 63 | 13.5 | 56 |
| 119 | 52 | — | — | 14.6 | 58 | 22.7 | 50 |
| 120 | 53 | — | — | 10.8 | 24 | 20.1 | 29 |
| 121 | 54 | — | — | 11.7 | 36 | 12.7 | 20 |
| 122 | 81 | — | — | 8.6 | 66 | 10.5 | 44 |
| 123 | 55 | — | — | 8.4 | 37 | 12.7 | 34 |
| 124 | 56 | — | — | 8.5 | 32 | 12.5 | 29 |
| 125 | — | 800K | 0.25 | 7.9 | 64 | 8.5 | 60 |
| 126 | — | " | 0.50 | 7.6 | 48 | 9.5 | 40 |
| 127 | — | " | 0.75 | 7.9 | 33 | 9.6 | 30 |
| 128 | — | " | 1.00 | 8.1 | 35 | 11.1 | 35 |
| 129 | 57 | — | — | 9.9 | 42 | 15.4 | 38 |
| 130 | 58 | — | — | 12.3 | 34 | 21.0 | 38 |
| 131 | 59 | — | — | 13.7 | 38 | 20.5 | 31 |

Several of the treated liquors have turbidities of 30 N.T.U. or less, far better than the plant practice of 200 N.T.U. or higher. In addition, settling rates are consistently above the required 5 ft/hr, and many are greater than 10 ft/hr.

EXAMPLES 132-134

For one of the reagents, following the procedure of Examples 113-131, dosage is decreased to as low as 0.5 ppm (mg/l), still maintaining low turbidity and high settling rate (Table XII)

TABLE XII

| | | Dosage | | | | |
|---|---|---|---|---|---|---|
| | Polymer | 2 PPM | | | | |
| Ex. | of Ex. No. | SR (ft/hr) | turbidity N.T.U. | 1 PPM ft/hr | N.T.U. | 0.5 PPM ft/hr | N.T.U. |
| 132-134 | 50 | 13.5 | 30 | 9.3 | 26 | 8.9 | 24 |

Compared to the existing plant practice, this reagent gives improved clarity.

EXAMPLES 137-138

The preparation of Examples 135-136 is repeated except that the starting emulsion is a 70/30 copolymer of acrylamide/acrylic acid with a molecular weight of about 15 million, and the amount of hydroxylamine used is just equivalent to the acrylamide content. The resultant product is tested on Bayer settler feed as in Examples 135-136. The results are as follows:

| Example | mg Polymer Per Liter Liquor | Settling Rate ft/hr. | Turbidity After 30 min. N.T.U. |
|---|---|---|---|
| 137 | 2 | 10.8 | 64 |
| 138 | 4 | 14.9 | 60 |

Both settling rates and clarities are much better than existing plant practice.

EXAMPLES 139-141

A 50:50 acrylamide/methyl acrylate copolymer latex is made by reaction of the monomers at 75° C., pH 2.0 for 3 hours with a commercial surfactant and stabilizer used to disperse the methyl acrylate in the aqueous acrylamide solution. Monomers are both pumped in gradually, along with an aqueous redox catalyst system.

The resulting polymer latex is gradually added to a refluxing (105° C.) solution of hydroxylamine sulfate and equivalent sodium hydroxide over a period of 100 minutes (1 mole hydroxylamine per mole acrylate).

A portion of the resultant product is diluted to 0.1% real polymer in water.

Settler feed (digester blow-off liquor with coarse particles removed) is collected from a Bayer alumina plant; this liquor contains 40+4 gm of suspended solids per liter. To mixed one liter portions of this liquor (at 80+5° C.) various dosages of the above 0.1% solution are added. Initial rate of settling is measured, then the mixture is allowed to settle in an 80° C. oven for 30 minutes. At the end of this time, a sample is withdrawn from the top and turbidity is measured (this supernatant is the laboratory equivalent of plant settler overflow liquor). Results are as follows:

| Example | mg Polymer Per Liter Liquor | Initial Settling Settling Rate ft/hr. | Turbidity After 30 min., N.T.U. |
|---|---|---|---|
| [plant settler performance | | 5.0* | 230.] |
| 139 | 4 | 4.1 | 135 |
| 140 | 6 | 4.4 | 65 |
| 141 | 8 | 3.5 | 54 |

*minimum requirement

Although settling rates are somewhat low, turbidity is considerably less than for the actual plant overflow liquor.

EXAMPLES 142-144

The preparation of Examples 139-141 is repeated except that the 50:50 acrylamide:methyl acrylate latex preparation uses 4 times the concentration of catalyst.

The resultant product is added to Bayer settler feed as in Examples 135-141.

| Example | mg Polymer Per Liter Liquor | Settling Rate ft/hr. | Turbidity After 30 min. N.T.U. |
|---|---|---|---|
| 142 | 4 | 7.1 | 63 |
| 143 | 6 | 6.0 | 74 |
| 144 | 8 | 7.2 | 46 |

Settling rates are acceptable and turbidity is much less than the usual plant practice, (see Examples 139-141).

EXAMPLES 145-147

A copolymer latex of 75:25 acrylic acid:methyl acrylate is made by gradually adding a mixture of the monomers and a redox catalyst system to water containing commercial surfactant and stabilizers. The mixture is maintained at 75° C. during the 2 hour reaction time.

Subsequently, an aqueous solution of hydroxylamine sulfate, [1 mole hydroxylamine per mole of acrylate] with equivalent NaOH, is gradually added over a 30 min. period to the above latex at 100° C. and the mixture is refluxed for an additional 60 minutes.

A 0.1% aqueous solution is made from the above mixture and tested for settling Bayer alumina solids as in Examples 139-141.

| Example | mg Polymer Per Liter Liquor | Settling Rate ft/hr. | Turbidity After 30 min. N.T.U. |
|---|---|---|---|
| 145 | 8 | 4.1 | 180 |
| 146 | 6 | 7.8 | 46 |
| 147 | 8 | 5.4 | 69 |

EXAMPLES 148-150

The preparations of Examples 145-147 are repeated. Tests on settling of solids in Bayer alumina liquor, as in Examples 139-141 are as follows:

| Example | mg Polymer Per Liter Liquor | Settling Rate ft/hr. | Turbidity After 30 min. N.T.U. |
|---|---|---|---|
| 148 | 4 | 8.0 | 66 |
| 149 | 6 | 6.9 | 68 |
| 150 | 8 | 6.8 | 40 |

EXAMPLES 151-152 (Comparative)

The preparation of Examples 145-147 is again followed except the copolymer composition is 90:10 acrylic acid:methyl acrylate. The resultant copolymer mixture is a clear solution (not latex). The copolymer is reacted with hydroxylamine sulfate and NaOH (equivalent to acrylate content) at 80° C. for 1 hour.

Tests on settling of solids in Bayer alumina liquor show the following results.

| Example | mg Polymer Per Liter Liquor | Settling Rate ft/hr. | Turbidity After 30 min. N.T.U. |
|---|---|---|---|
| 151 | 4 | 3.3 | 264 |
| 152 | 6 | 5.0 | 203 |

The poor results are attributed to the low methyl acrylate content and the low conversion of this ester to hydroxamate. Polymer of this example is found (by NMR) to contain no detectable hydroxamate (limit of detectability=1-2%). NMR also indicates that methyl acrylate incorporation into the polymer is low.

EXAMPLES 153-154

The preparation of Examples 145-147 are followed except that the copolymer produced contains 50:50 acrylic acid:methyl acrylate. The copolymer product is a coarse dispersion of solid which settles out if not stirred.

Hydroxylamine sulfate and NaOH (equivalent to acrylate content) are added to the dispersion and heated at 97° C. for 1 hour to give a solution. The resultant polymer is tested for settling solids in Bayer alumina liquor, as previously. Results are specified below:

| Example | mg Polymer Per Liter Liquor | Settling Rate ft/hr. | Turbidity After 30 min. N.T.U. |
|---|---|---|---|
| 153 | 6 | 6.8 | 101 |
| 154 | 8 | 7.4 | 86 |

EXAMPLES 155-156

A 25:75 acrylamide:methyl acrylate copolymer latex is made and subsequently reacted with hydroxylamine sulfate and NaOH, as in Examples 139-141.

These reactions are followed by reaction with NaOH (3 hours @ 95° C.) to hydrolyze unreacted ester.

The final polymer is tested for settling solids in Bayer alumina liquor, as previously. Results are as enumerated below.

| Example | mg Polymer Per Liter Liquor | Settling Rate ft/hr. | Turbidity After 30 min. N.T.U. |
|---|---|---|---|
| 155 | 6 | 5.9 | 43 |
| 156 | 8 | 3.8 | 32 |

EXAMPLE 157

To a sample of red mud slurry, obtained from the last washer of a counter current decantation mud washing train in an operating. Bayer alumina plant is added a dilute (0.1%) solution of Polymer A. Rapid flocculation and settling of the solids of the slurry is observed.

EXAMPLES 158-161

The procedures of Examples 1 or 8 are again followed except that various hydroxamated polymers are substituted for the polymers used therein to flocculate the solids from the substrates involved. The polymers are listed below. In each instance, excellent results are observed.

| Ex. | Polymer | % Hydroxamation | Procedure of Ex. Followed |
|---|---|---|---|
| 158 | 71/29 AM/MMA | 22.5 | 8 |
| 159 | 90/10 AM/DMAEA | 90.0 | 1 |
| 160 | 50/50 MA/MVE | 32.6 | 1 |
| 161 | PAN | 11.0 | 8 |

AM = acrylamide
DMAEM = dimethylaminoethylacrylate
MMA = methyl methacrylate
MA = maleic anhydride
PAN = polyacrylonitrile
MVE = methyl vinyl ether It is understood that mixtures of two or more hydroxamic acid-containing polymers of the present invention may be used together without departing from the spirit of the present invention, and that combinations of the hydroxamic acid-containing polymers of the present invention with other reagents may also be used together and remain within the scope hereof.

We claim:
1. A process for removing suspended solids from the Bayer alumina process, the improvement comprising contacting and efficiently mixing a Bayer process stream with a water-soluble polymer containing pendant hydroxamic acid or salt groups in an amount effective to flocculate and settle the suspended solids therein, said polymer having a molecular weight ranging from about $1 \times 10^4$ to about $3 \times 10^7$ and removing flocculated and settled suspended solids from said process stream.
2. A process according to claim 1 wherein said polymer is derived from a polymer containing pendant ester, amide, anhydride or nitrile groups.
3. A process according to claim 2 wherein said polymer is derived from an amide polymer.
4. A process according to claim 2 wherein said polymer is derived from an acrylamide polymer.
5. A process according to claim 2 wherein said polymer is derived from an ester polymer.
6. A process according to claim 2 wherein said polymer is derived from an acrylate or methacrylate polymer.
7. A process according to claim 1 wherein said process stream is settler feed.
8. A process according to claim 1 wherein said process stream is settler overflow.
9. A process according to claim 1 wherein said process stream is blow-off discharge.
10. A process according to claim 1 wherein said process stream is feed to a mud washer in the washer train.
11. A process according to claim 1 wherein said polymer is in the form of an emulsion.
12. A process according to claim 1 wherein the degree of hydroxamation of said polymer ranges from about 1 to about 90 mole percent.
13. A process according to claim 1 wherein the degree of hydroxamation of said polymer ranges from about 5 to about 75 mole percent.
14. A process according to claim 1 wherein the degree of hydroxamation of said polymer ranges from about 10 to about 50 mole percent.
15. A process according to claim 1 wherein said polymer is employed in conjunction with an anionic flocculant.
16. A process according to claim 15 wherein said anionic flocculant is starch or flour.
17. A process according to claim 15 wherein said anionic flocculant is the salt of a polyacrylate polymer.
18. A process according to claim 15 wherein said anionic flocculant is an acrylate salt/acrylamide copolymer.

* * * * *